S. F. Estell,
Cage Trap.
No. 58,795.   Patented Oct. 16, 1866.

Witnesses:

Inventor,
Samuel F. Estell

UNITED STATES PATENT OFFICE.

SAML. F. ESTELL, OF RICHMOND, INDIANA.

IMPROVEMENT IN ANIMAL-TRAPS.

Specification forming part of Letters Patent No. 58,795, dated October 16, 1866.

*To all whom it may concern:*

Be it known that I, SAMUEL F. ESTELL, of Richmond, Wayne county, Indiana, have invented certain new and useful Improvements in Rat-Traps; and I do hereby declare the following to be a full, clear, and exact description of the same, reference being had to the accompanying drawings and the letters of reference marked thereon.

Figure 1:
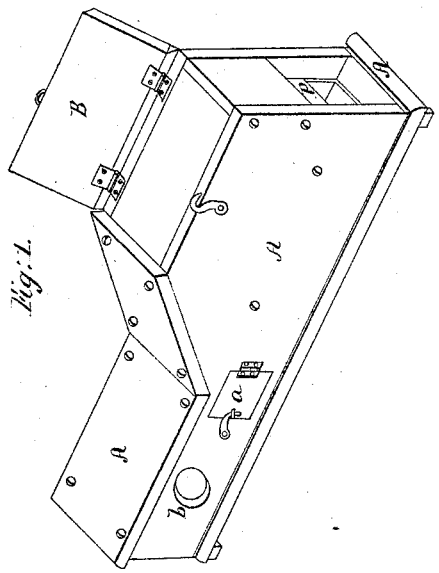
Figure 3:
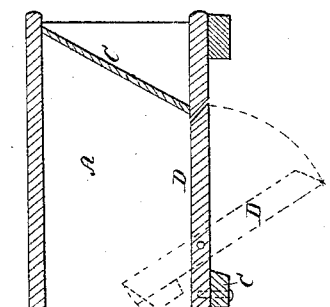
Figure 3:
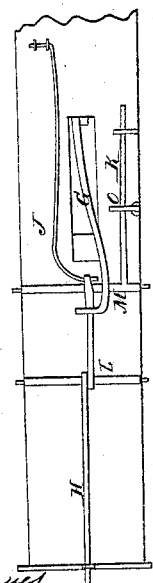
Figure 2:
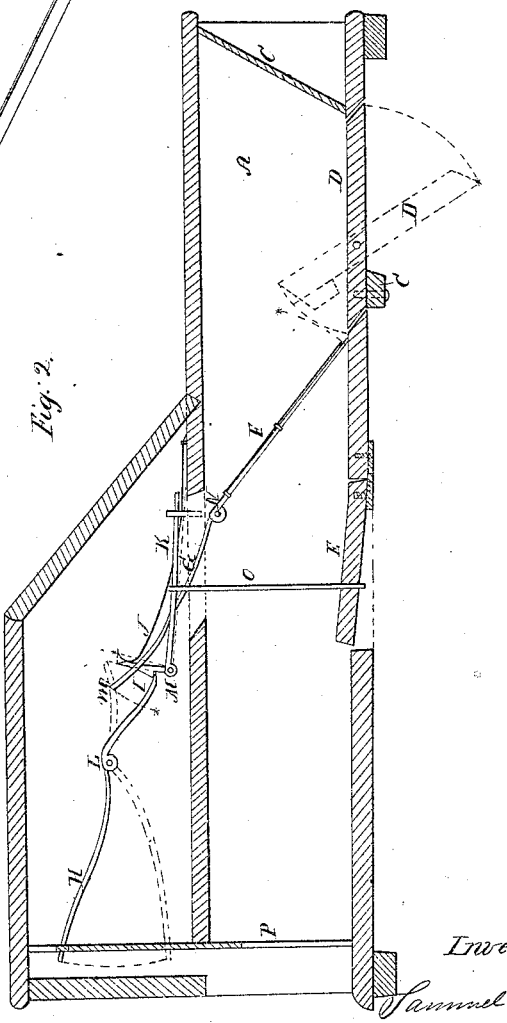

In the drawings, Figure 1 is a perspective view of the trap. Fig. 2 is a vertical sectional view of the same; and Fig. 3 is a top view of the device for setting and springing the trap.

A, Fig. 1, represents the framing of a box of oblong form, one end of which is constructed of nearly double the height, forming a receptacle for the devices for operating the trap. The floor or bottom of the trap is provided with a hinged platform, E, extending nearly across its width, as shown in Fig. 2. There is also a second platform in the bottom of the trap, (marked D,) which turns upon pivots, and whose motion is described by the dotted lines D, Fig. 2. A weight, c, is attached to one end of this platform as a counter-balance, operating to close the platform after it shall have been opened. The small end of the trap is closed by a pane of glass, C, which serves to admit the light. The rack or frame F is composed of a series of rods or prongs, connected in a suitable manner, and terminating in a lever or arm, G, and vibrating upon the shafts or pins, suitably arranged for that purpose on the inside of the box or trap. The upper end of the arm G is bent at right angles to form a bearing, m. The bent lever H is hinged or pivoted upon the shaft L, which extends across the framing, and at its lower end is pointed, so as to fit a notch in the post I. The upper end of the arm or lever H operates a perpendicular sliding plate, P, which occupies the front end of the trap, and has an up-and-down movement in guides or grooves in the side pieces of the box or trap.

I is a post attached to the arm or shaft M, and vibrated by the lever K. The spring J serves to hold the post I up to the point of the lever H and insures the proper action of the point and notch.

O is a perpendicular rod or shaft, connected at the lower end with the hinged platform E, and at the upper end provided with a hook, which rests upon and operates the lever K. A door may be placed in the side, as shown at *a;* or an opening, *b,* may be used.

B is a hinged cover to that portion of the box containing the operative devices of the trap.

The operation of the trap is substantially as follows: The bait used is placed upon the floor of the trap, forward of the hinged platform E, and in reaching it the animal is compelled to pass over the same, and its weight thereon, operating through the means of rod O and arm K, serves to release the point of the lever H from the notch in the post I, and the sliding plate P is thus released and closes the entrance. The animal then passing forward toward the light admitted through the pane of glass C encounters the rack F, placed in an oblique position, and arranged so as to yield readily to the pressure, which raises it sufficiently to allow of his escape. As the rack F is raised by the animal passing under it, the bearing *m* of the arm G is brought in contact with the lower part of the arm H, as shown in the dotted lines, Fig. 2, until the point is sufficiently depressed to be received and held by the notch in post I, by which the trap is again set and the sliding-plate P raised to admit the entrance of another victim.

Having thus fully described my said improvement, what I claim as new, and desire to secure by Letters Patent, is—

A rat-trap in which the self-setting devices, as set forth and described, are placed in an apartment of said trap immediately above and separate from the body of the trap, substantially as and for the purposes herein mentioned.

SAMUEL F. ESTELL.

Witnesses:
 WM. T. DENNIS,
 JOSEPH RIDGE.